(12) United States Patent
Bai et al.

(10) Patent No.: US 10,575,155 B1
(45) Date of Patent: Feb. 25, 2020

(54) UNIFIED VEHICLE SERVICE FRAMEWORK FOR INTERFACING INDEPENDENTLY LOCATED PROVIDERS AND RECIPIENTS

(71) Applicant: GM Global Technology Operations LLC, Detroit, MI (US)

(72) Inventors: Fan Bai, Ann Arbor, MI (US); Thomas E. Fuhrman, Shelby Township, MI (US); Soheil Samii, Royal Oak, MI (US); Prathap Venugopal, Troy, MI (US); Massimo Osella, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/366,492

(22) Filed: Mar. 27, 2019

(51) Int. Cl.
*H04W 4/00* (2018.01)
*H04W 4/50* (2018.01)
*H04W 4/44* (2018.01)
*H04L 29/08* (2006.01)

(52) U.S. Cl.
CPC ............... *H04W 4/50* (2018.02); *H04W 4/44* (2018.02); *H04L 67/10* (2013.01)

(58) Field of Classification Search
CPC .............. H04W 36/14; H04W 48/18; H04N 21/41422; H04L 67/306; H04L 67/10; H04L 67/125
See application file for complete search history.

(56) References Cited

U.S. PATENT DOCUMENTS

| | | | | |
|---|---|---|---|---|
| 8,514,825 | B1* | 8/2013 | Addepalli | H04W 4/046 370/338 |
| 9,288,270 | B1* | 3/2016 | Penilla | H04W 4/046 |
| 2017/0197617 | A1* | 7/2017 | Penilla | B60W 30/09 |
| 2018/0287891 | A1* | 10/2018 | Shaw | H04L 67/322 |
| 2019/0176845 | A1* | 6/2019 | Yoon | B60W 50/14 |
| 2019/0230401 | A1* | 7/2019 | Chamberlain | H04N 21/41422 |

* cited by examiner

*Primary Examiner* — Shantell L Heiber
(74) *Attorney, Agent, or Firm* — Quinn IP Law

(57) ABSTRACT

Method and system for interfacing a plurality of providers and a plurality of recipients that are independently located with a unified vehicle service framework having a quality of service filter and a broker module. A first cloud unit has at least one of the plurality of providers and the plurality of recipients. A first vehicle and a second vehicle each respectively have another at least one of the plurality of providers and the plurality of recipients. A second cloud unit has yet another at least one of the plurality of providers and the plurality of recipients. The unified vehicle service framework is configured to receive a subscription request and determine whether it is granted based in part on a quality of service score assigned by the quality of service filter. When the subscription request is granted, respective services from plurality of providers are routed through the broker module.

20 Claims, 4 Drawing Sheets

UNIFIED VEHICLE SERVICE FRAMEWORK FOR INTERFACING INDEPENDENTLY LOCATED PROVIDERS AND RECIPIENTS

INTRODUCTION

The present disclosure relates generally to a method and system for interfacing a plurality of providers and a plurality of recipients with a unified vehicle service framework. The ever-increasing complexity of devices, including but not limited to vehicles, has led to an increase in the amount of information provided by various entities and consumable by various applications. The paradigm for information flow is generally implemented separately for inter-vehicle communication and intra-vehicle communication. It is challenging to consolidate the flow of information when the providers and recipients of information are scattered across various systems and sub-systems.

SUMMARY

Disclosed herein is a method and system for interfacing a plurality of providers and a plurality of recipients with a unified vehicle service framework. The unified vehicle service framework includes a quality of service filter and a broker module. The plurality of providers and the plurality of recipients are independently located. A first cloud unit has at least one of the plurality of providers and the plurality of recipients (e.g. one provider or one recipient). A plurality of vehicles includes a first vehicle and a second vehicle. The first vehicle and the second vehicle each respectively having another at least one of the plurality of providers and the plurality of recipients.

The unified vehicle service framework includes a processor and tangible, non-transitory memory on which instructions are recorded. Execution of the instructions by the processor causing the unified vehicle service framework to maintain a database of the plurality of providers, the plurality of recipients and respective services provided by the plurality of providers. The unified vehicle service framework is configured to receive a subscription request from a requesting member of the plurality of recipients for respective services. The unified vehicle service framework is configured to determine whether the subscription request is granted based on a quality of service score assigned by the quality of service filter and notify the requesting member of the plurality of recipients. When the subscription request is granted, the respective services are routed through the broker module.

The quality of service score may be a weighted sum of a priority score, a persistency score, an inter-relation score and an authorization score. The priority score is assigned to the subscription request based on a relative importance value. The persistency score is assigned to the subscription request based on an average time spent by the respective services in the broker module until consumption. The inter-relation score is assigned to the subscription request based on a relatedness to other ones of the respective services. The authorization score is assigned to the subscription request based on at least one of a security factor and a trust factor associated with the requesting member of the plurality of recipients.

The unified vehicle service framework may include a syntax module configured to classify the respective services as at least one of a message service and an invocation service. The message service is defined as an informational message not requiring an action from the plurality of recipients. The invocation service is defined as automatically triggering a pre-determined response from the plurality of recipients.

The broker module includes at least one leaf unit configured to directly engage with one or more of the plurality of providers and the plurality of recipients, and a root server hosted by the first cloud unit. The broker module includes at least one branch unit configured to act as an intermediary between the root server and the leaf unit to route the respective services. The respective services are registered at the root server. In one embodiment, the at least one leaf unit and the at least one branch unit are hosted by the first cloud unit. In another embodiment, the at least one leaf unit is hosted by the first vehicle.

The branch unit may be configured to execute multiple control plane modules, including a children node registration module, a parent node registration module and a broker module maintenance module. The children node registration module and the parent node registration module include a respective data structure registering one or more nodes downstream and upstream, respectively, of the at least one branch unit in the broker module. The broker module maintenance module is configured to record an entry of a new unit in the broker module and record a non-working unit in the broker module.

The branch unit may be configured to execute multiple data plane modules. The multiple data plane modules may include a physical topology maintenance module configured to maintain one or more centralized modules recording an entry of a new node or a departure of an existing node. The multiple data plane modules may include a data traffic shaping module configured to artificially delay traffic to allow the respective services with a higher value of the quality of service score to be transmitted relatively earlier. The multiple data plane modules may include a virtual provider module configured to aggregate the respective services provided by the plurality of providers into a single virtual service when the respective services have an equal value of the quality of service score. The data traffic shaping module is configured to regard the single virtual service as a single piece of data.

The above features and advantages and other features and advantages of the present disclosure are readily apparent from the following detailed description of the best modes for carrying out the disclosure when taken in connection with the accompanying drawings.

DETAILED DESCRIPTION

Figure 1:
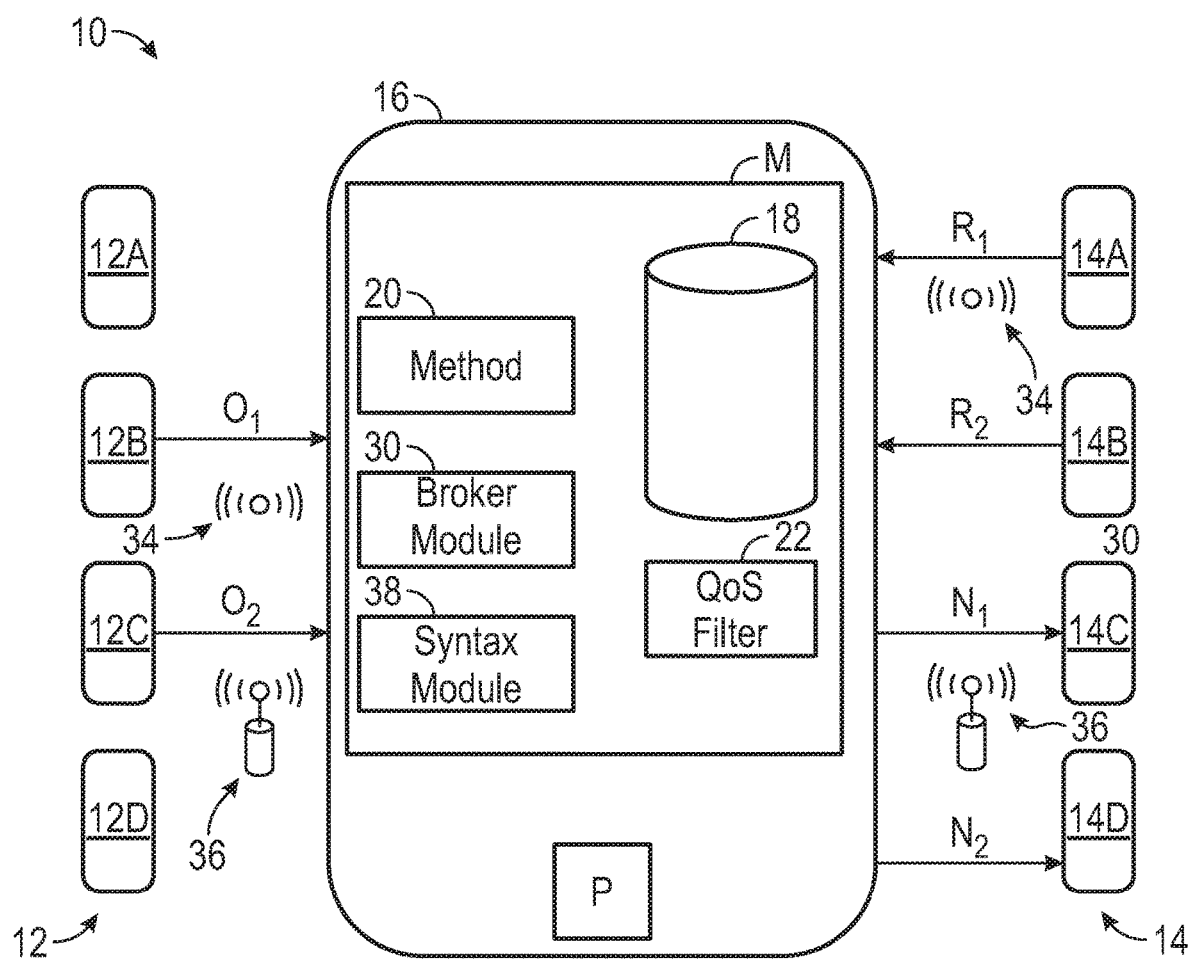
FIG. 1 is a schematic illustration of a system for interfacing a plurality of providers and a plurality of recipients through a unified vehicle service framework, the unified vehicle service framework having a broker module.

Referring to the drawings, wherein like reference numbers refer to like components, FIG. 1 schematically illustrates a system 10 for interfacing a plurality of providers 12 with a plurality of recipients 14 through a unified vehicle service framework 16. Referring to FIG. 1, the plurality of providers 12 may include a first provider 12A, a second provider 12B, a third provider 12C and a fourth provider 12D, Referring to FIG. 1, the plurality of recipients 14 may include a first recipient 14A, a second recipient 14B, a third recipient 14C and a fourth recipient 14D. The number of plurality of providers 12 and plurality of recipients 14 may be varied based on the application at hand. The system 10 unifies inter-vehicle communication and intra-vehicle communication and provides a lower latency due to a common protocol, avoiding translation between in-vehicle and intra-vehicle communication systems.

The plurality of providers 12 and the plurality of recipients 14 may be physically independently located or hosted. In other words, the physical location of one of the plurality of providers 12 and the plurality of recipients 14 is unaffected by or independent of the physical location of others. The plurality of providers 12 are the source of information, referred to herein as respective services, utilized by the recipient 14. The plurality of providers 12 may provide synthesized data, such as a sensor output. The plurality of recipients 14 may be intelligent software modules or mobile applications ("apps"). Examples of the respective services include, but are not limited to, global positioning system (GPS) services, fault management service, weather information service, traffic information service, radar sensor data and optical sensor data from a particular location and calibration data for consumption by various algorithms in a vehicle.

Referring to FIG. 1, the unified vehicle service framework 16 includes a processor P and a tangible, non-transitory memory M configured to store data structures, such as a database 18. The unified vehicle service framework 16 is configured to maintain the database 18 of the plurality of providers 12, the plurality of recipients 14 and the respective services. The memory M can store multiple controller-executable instruction sets, and the processor P can execute the multiple controller-executable instruction sets stored in the memory M. Referring to FIG. 1, the multiple controller-executable instruction sets include a method 20 and a quality of service filter 22, described in detail with respect to FIG. 2.

Figure 3:
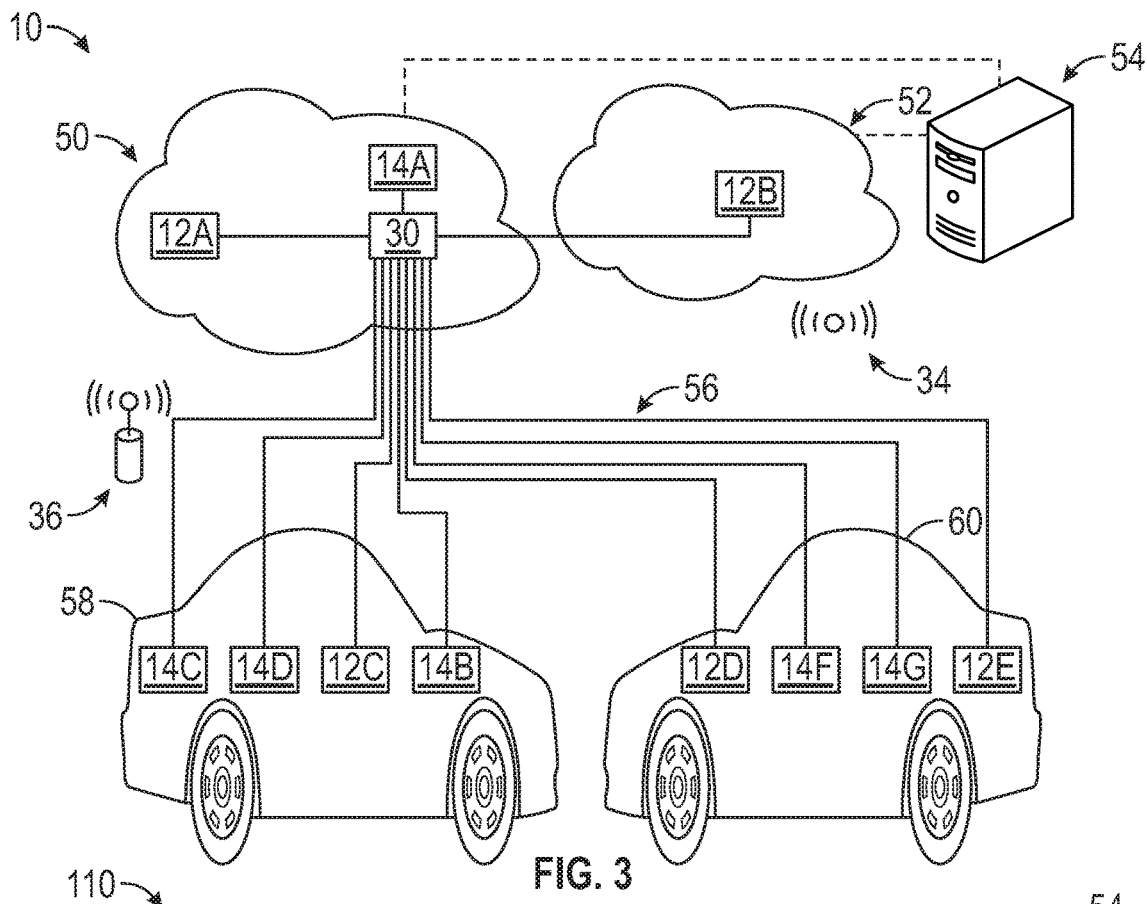
FIG. 3 is a schematic first example implementation of the system of FIG. 1, with a centralized broker architecture for the broker module.
Figure 4:
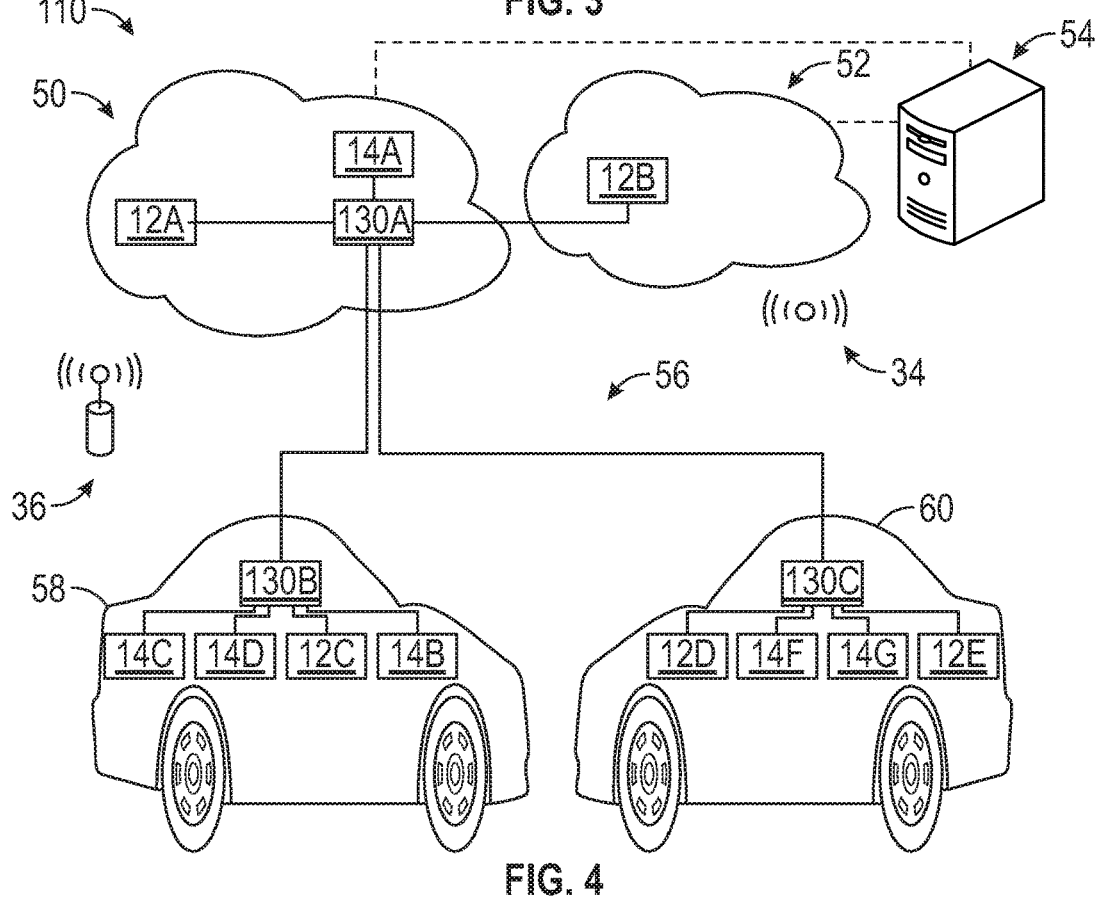
FIG. 4 is a schematic second example implementation of the system of FIG. 1, with a distributed broker architecture for the broker module.

Referring to FIG. 1, the unified vehicle service framework 16 includes a broker module 30 for routing the respective services from the plurality of providers 12 to the plurality of recipients 14. The broker module 30 may be configured in different ways. FIG. 3 shows an example implementation of the system 10 with a centralized broker architecture. FIG. 4 shows another example of a system 110 with a distributed broker architecture. Referring to FIGS. 3-4, the systems 10, 110 include a first cloud unit 50 having at least one of the plurality of providers 12 and the plurality of recipients 14. Stated differently, the first cloud unit 50 is host to at least one member, which may be a provider or a recipient. In the example shown, the first cloud unit 50 is host to the first provider 12A and the first recipient 14A. A second cloud unit 52 includes yet another at least one of the plurality of providers 12 and the plurality of recipients 14. In the example shown, the second cloud unit 52 is host to the second provider 12B. For example, first cloud unit 50 may be maintained/owned by a vehicle manufacturer and the second cloud unit 52 may be maintained/owned by a supplier of a component used by the vehicle manufacturer. The first cloud unit 50 and the second cloud unit 52 may include one or more remote servers (not shown) hosted on the Internet to store, manage, and process data. The first cloud unit 50 and the second cloud unit 52 may be linked to a central server 54.

Referring to FIGS. 3-4, the systems 10, 110 include a plurality of vehicles 56, such as first vehicle 58 and second vehicle 60. The first vehicle 58 and the second vehicle 60 each respectively have another at least one of the plurality of providers 12 and the plurality of recipients 14. In the example shown, the first vehicle 58 includes the third provider 12C, the second recipient 14B, the third recipient 14C, and the fourth recipient 14D. In the example shown, the second vehicle 60 includes a fourth provider 12D, a fifth provider 12E, a sixth recipient 14F and a seventh recipient 14G. For example, the fourth provider 12D may be a mobile app running in the control unit (not shown) of the second vehicle 60 and specifically programmed to retrieve information stored on the vehicle bus, including information transmitted to the vehicle bus by a radar sensor.

In the first embodiment shown in FIG. 3, the broker module 30 is hosted solely by the first cloud unit 50. In the second embodiment shown in FIG. 4, the broker module 30 is divided with into multiple sub-broker modules hosted at multiple locations. In the example shown in FIG. 4, a first sub-broker 130A is located in the first cloud unit 50, a second sub-broker 130B is located in the first vehicle 58 and a third sub-broker 130C is located in the second vehicle 60. The broker module 30, the first sub-broker 130A, the second sub-broker 130B and the third sub-broker 130C may include a respective memory to store instructions and a respective processor to carry out the instructions.

The plurality of vehicles 56 may be mobile platforms such as, but not limited to, a passenger car, sport utility vehicle, light truck, heavy duty vehicle, ATV, minivan, bus, transit vehicle, bicycle, robot, farm implement, sports-related equipment, boat, plane, train or other transportation devices. The plurality of vehicles 56 may include transportation devices of many different forms and include multiple and/or alternate components and facilities.

Figure 2:
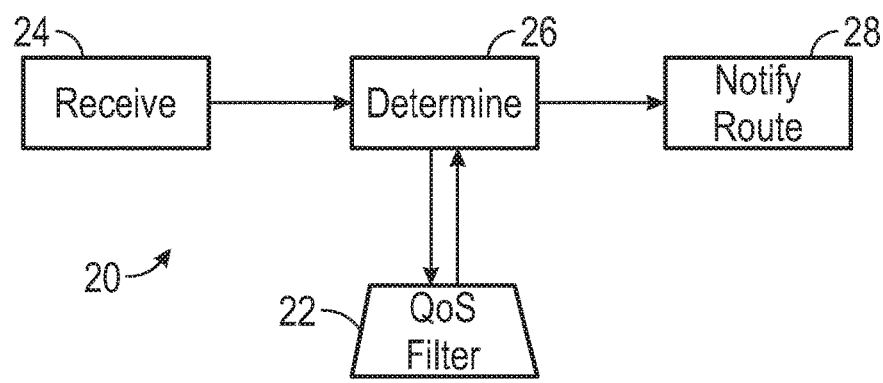
FIG. 2 is a schematic flow diagram for a method executable by the unified vehicle service framework of FIG. 1.

Referring now to FIG. 2, a flowchart of the method 20 is shown. Method 20 need not be applied in the specific order recited herein and some blocks may be omitted. The unified vehicle service framework 16 is specifically programmed to execute the blocks of the method 20. Per block 24, the unified vehicle service framework 16 is configured to receive a subscription request from a requesting member (e.g. first recipient 14A) of the plurality of recipients 14 for the respective services originating from another of the plurality of providers 12. The term "subscription" refers to agreeing to have data delivered for a period of time. For example, the unified vehicle service framework 16 may receive a first request $R_1$ from the first recipient 14A, and a second request $R_2$ from the second recipient 14B. Alternatively, the plurality of providers 12 may be configured to send respective subscription offers to the plurality of recipients 14, such as for example, first offer $O_1$ (see FIG. 1) and second offer $O_2$, from the second provider 12B and the third provider 12C, respectively. The subscription offers may be forwarded to more than one of the plurality of recipients 14 at the same time.

Per block 26, the unified vehicle service framework 16 is configured to determine whether the subscription request is granted based on the quality of service filter 22. The quality of service filter 22 is configured to assign a total score as a weighted sum of a plurality of scores. The weighting factors ($w_i$) may be selected based on the application at hand. The plurality of scores may include a priority score, a persistency score, an inter-relation score and an authorization score. The subscription request may be granted when the total score exceeds a threshold score and/or when each of the plurality of scores exceed individual respective thresholds.

$$\text{Total Score} = (w_1 * \text{Priority Score} + w_2 * \text{Persistency Score} + w_3 * \text{Inter-relation Score} + w_4 * \text{Authorization Score}).$$

$$(w_1 + w_2 + w_3 + w_4) = 1$$

The priority score is assigned to the subscription request based on a relative importance value, for example, a service related to brake function may be granted greater score than a service related to an infotainment system. The persistency score assigned to the subscription request based on an average time spent by the respective services in the system 10 until consumption. In other words, the respective services that are consumed quickly will be granted a higher score.

An inter-relation score assigned to the subscription request based on a relatedness to other respective services, such that messages are bundled together based on relationship graph. The inter-relation value reflects whether or not the request involves respective services/data that have some commonality with other existing subscriptions in the system. The value is the highest if the subscription request is for a service that already is shared with another of the plurality of recipients 14 that is on the same hardware, for example, both being in the control unit of the first vehicle 58.

An authorization score assigned to the subscription request based on at least one of a security factor and a trust factor associated with the requesting member of the plurality of recipients 14. In a non-limiting example, a third-party app requests to subscribe to a service that provides high-definition map data for autonomous vehicles. This data may be stored in the first cloud unit 50 or in the plurality of vehicles 56, or a combination of the two. The third-party app in question is a navigation only app and does not have the proper authorization to access such data. The authorization score is thus assigned the lowest possible value.

Per block 28 of FIG. 2, the unified vehicle service framework 16 is configured to notify the requesting member of the plurality of recipients 12 as to whether the request to subscribe is granted, for example, through first notification $N_1$ (see FIG. 1) and second notification $N_2$ to the third recipient 14C and the fourth recipient 14D, respectively. When the subscription request is granted, the respective services are routed from the database 18 to the requesting member (e.g. first recipient 14A) of the plurality of recipients 14 via the broker module 30, shown in FIGS. 1, 3 and 5.

Referring to FIGS. 1 and 3-4, the plurality of providers 12 and plurality of recipients 14 may communicate with the unified vehicle service framework 16 through either one or a combination of a short-range network 34 and a long-range network 36. Referring to FIGS. 1 and 3-4, the short-range network 34 may be wireless or may include physical components. The short-range network 34 may be a bus implemented in various ways, such as for example, a serial communication buses in the form of a local area network. The network connection N may include, but is not limited to a Controller Area Network (CAN), a Controller Area Network with Flexible Data Rate (CAN-FD), Ethernet, blue tooth, WIFI and other forms of data connection. The short-range network 34 may be a Bluetooth™ connection, defined as being a short-range radio technology (or wireless technology) aimed at simplifying communications among Internet devices and between devices and the Internet. Bluetooth™ is an open wireless technology standard for transmitting fixed and mobile electronic device data over short distances and creates personal networks operating within the 2.4 GHz band. Other types of connections may be employed.

The long-range network 36 may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities. Other types of connections may be employed. Each of the plurality of vehicles may include a respective wireless transceiver (not shown), an adapter or other circuitry available to those skilled in the art to enable communication via the short-range network 34 and the long-range network 36.

Additionally, referring to FIG. 1, the unified vehicle service framework 16 may include executable instructions associated with a syntax module 38. The syntax module 38 is configured to distinguish between a message service and an invocation service. The respective services may be characterized as a message service or an invocation service. The message service is defined acts as an informational message without requiring an action or response from the plurality of recipients 14 in question. The invocation service is configured to automatically trigger a reply from the plurality of recipients 14 in question. The invocation service is subject to greater restrictions relative to the message service. For example, a subscription request associated with an invocation service may require a greater threshold for the total score (assigned by the quality of service filter 22) in order to be granted by the unified vehicle service framework 16, compared to the message service.

Figure 5:
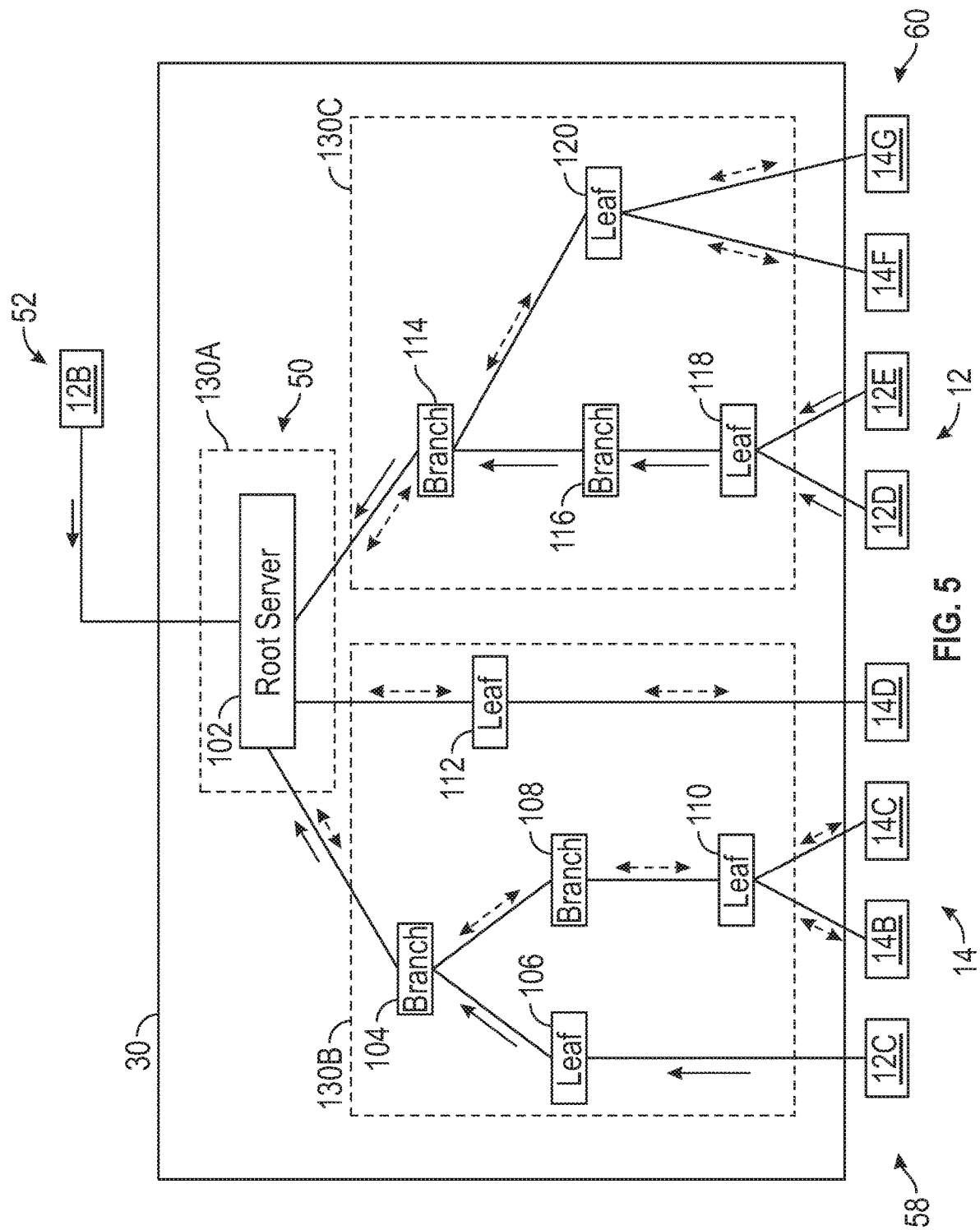
FIG. 5 is a schematic illustration of an example broker module employed in the unified vehicle service framework of FIG. 1, the broker module having a branch unit.

Referring now to FIG. 5, an example topology is shown for the broker module 30 of FIG. 3 and the first sub-broker 130A, a second sub-broker 130B and third sub-broker 130C, of FIG. 4. Referring to FIG. 5, the broker module 30 includes a root server 102 hosted by the first cloud unit 50. The respective services are registered at the root server 102. The routing of the respective services from the plurality of PROVIDERS 12 to the root server 102 is shown with solid arrows. Requests to subscribe (or unsubscribe) from the plurality of recipients 14 to the root server 102 and notifications from the root server 102 to the plurality of recipients 14 are shown with dual-direction dashed arrows.

The broker module 30 includes at least one leaf unit, such as first leaf 106, configured to directly engage with one or more of the plurality of providers 12 and the plurality of recipients 14. The broker module 30 includes at least one branch unit, such as first branch 104, configured to act as an intermediary between the root server 102 and the at least one leaf unit, such as the first leaf 106. In the example shown in FIG. 5, the broker module 30 includes a first branch 104, a second branch 108, a third branch 114, a fourth branch 116, a first leaf 106, a second leaf 110, a third leaf 112, a fourth leaf 118 and a fifth leaf 120. It is to be understood that alternative configurations may be employed.

In the centralized broker architecture, the first cloud unit 50 hosts the entire broker module 30, including the root server 102, the branches and the leaves. In the distributed architecture, the first cloud unit 50 hosts the root server 102, however, the branches and the leaves may be located or hosted in the second cloud unit 52, the plurality of vehicles 56 and other locations. The centralized broker architecture may be suitable for applications with strong requirements in terms of reliability, data consistency and transactional completeness. The distributed broker architecture may be suitable for applications with strong requirements in terms of high throughput, low latency and system efficiency.

In FIG. 5, the configuration for the broker module 30 is overlaid with the configuration for the first sub-broker 130A, second sub-broker 130B and third sub-broker 130C. Referring to FIG. 5, the first sub-broker 130A includes a root server 102. The second sub-broker 130B includes a first branch 104, a second branch 108, a first leaf 106, a second leaf 110 and a third leaf 112. The third sub-broker 130C includes a third branch 114, a fourth branch 116, a fourth leaf 118 and a fifth leaf 120.

In the example shown in FIGS. 3-4, the first vehicle 58 includes a third provider 12C, second recipient 14B, third recipient 14C and fourth recipient 14D, also shown in FIG. 5. The third provider 12C may be configured to route their respective services to the root server 102 via the first branch 104 and the first leaf 106. The second recipient 14B and the third recipient 14C may be configured to convey requests to and receive notification from the root server 102 via the first branch 104, the second branch 108 and the second leaf 110. The fourth recipient 14D may be configured to communicate with the root server 102 via the third leaf 112.

In the example shown in FIGS. 3-4, the second vehicle 60 includes a fourth provider 12D, a fifth provider 12E, a sixth recipient 14F and a seventh recipient 14G, also shown in FIG. 5. The fourth provider 12D and the fifth provider 12E may be configured to route their respective services to the root server 102 via the third branch 114, the fourth branch 116 and the fourth leaf 118. The sixth recipient 14F and the seventh recipient 14G may be configured to convey requests to and receive notification from the root server 102 via the third branch 114 and the fifth leaf 120.

Figure 6:
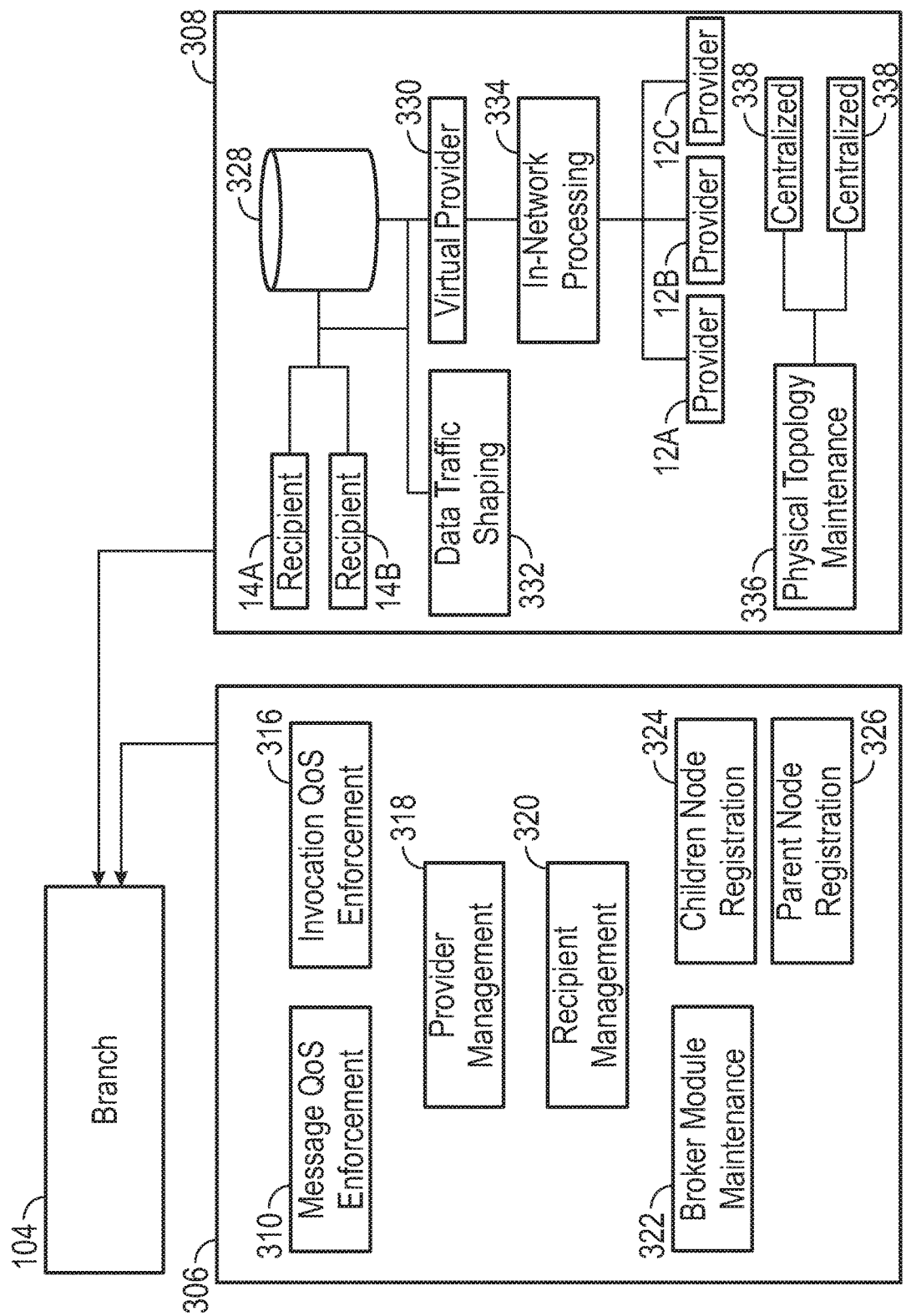
FIG. 6 is a schematic illustration of operations carried out by the branch unit of FIG. 5.

FIG. 6 shows an example of operations carried out by at least one branch unit of the broker module 30, such as the first branch 104 of FIG. 5. Referring to FIG. 6, the branch unit 104 is configured to execute multiple control plane modules 306 and multiple data plane modules 308. The control plane modules 306 may include a message QoS enforcement module 310 and invocation QoS enforcement module 316 configured to implement and enforce respective rules stored in the syntax module 38 (see FIG. 1). The multiple control plane modules 306 include a provider management module 318 and recipient management module 320, each respectively configured to manage requests, notices or messages to and from the plurality of providers 12 and the plurality of recipients 14 (see FIG. 1).

Referring to FIG. 6, the multiple control plane modules 306 may include a broker module maintenance module 322 configured to record an entry of a new unit and record the loss of a unit, such as a non-working unit, in the broker module 30. The multiple control plane modules 306 may include a children node registration module 324 and a parent node registration module 326, each having a respective data structure registering one or more nodes downstream and upstream, respectively, of the branch unit 104.

Referring to FIG. 6, the multiple data plane modules 308 may include a database maintainer 328 configured to maintain a record of the respective services routed, such as the respective services routed to the first recipient 14A and the second recipient 14B. Referring to FIG. 6, the multiple data plane modules 308 may include a data traffic shaping module 332 configured to artificially delay traffic to allow the respective services with a higher value of the quality of service score to be transmitted relatively earlier. The data plane modules 308 may include a virtual provider module 330 configured to aggregate the respective services provided to the plurality of recipients 14, such as the first recipient 14A and the second recipient 14B, via an in-network processing module 334. For example, if the respective services provided by the first provider 12A, second provider 12B and the third provider 12C have an equal value of the quality of service score, they may be aggregated into one virtual service by the virtual provider module 330 and considered as one piece of data by the data traffic shaping module 332, hence simplifying data handling. Referring to FIG. 6, the multiple data plane modules 308 may further include a physical topology maintenance module 336 configured to maintain one or more centralized modules 338 recording an entry of a new node or a departure of an existing node.

In summary, the systems 10, 110 unify both intra-vehicle communication and inter-vehicle communication and provide transparency to app developers of mobile applications, regardless of where the apps are embedded or located. Additionally, a scalable and flexible solution is provided, while maintaining proper function isolations. The unified vehicle service framework 16 (and execution of the method 20) improves the functioning of the plurality of vehicles 56 by allowing rapid access to the respective services originating in a plurality of providers 12, which may be located in the same vehicle as the recipient, a different vehicle, a first cloud unit 50, a second cloud unit 52 or other location.

The unified vehicle service framework 16 includes at least one computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for interfacing a plurality of providers and a plurality of recipients, the system comprising:
   a unified vehicle service framework configured to communicate with the plurality of providers and the plurality of recipients, the unified vehicle service framework including a quality of service filter and a broker module;
   wherein the plurality of providers and the plurality of recipients are independently located;
   a first cloud unit having at least one of the plurality of providers and the plurality of recipients;
   a plurality of vehicles including a first vehicle and a second vehicle, the first vehicle and the second vehicle each respectively having another at least one of the plurality of providers and the plurality of recipients;
   wherein the unified vehicle service framework includes a processor and tangible, non-transitory memory on which instructions are recorded, execution of the instructions by the processor causing the unified vehicle service framework to:
      receive a subscription request from a requesting member of the plurality of recipients for respective services originating in the plurality of providers;
      determine whether the subscription request is granted based on a quality of service score assigned by the quality of service filter and notify the requesting member of the plurality of recipients; and
      when the subscription request is granted, route the respective services through the broker module;
   wherein the quality of service score is a weighted sum of multiple factors, the multiple factors including a priority score and a persistency score; and
   wherein the priority score is assigned to the subscription request based on a relative importance value and the persistency score is assigned to the subscription request based on an average time spent by the respective services in the broker module until consumption.

2. The system of claim 1, further comprising:
   a second cloud unit having yet another at least one of the plurality of providers and the plurality of recipients.

3. The system of claim 1, wherein:
   the multiple factors include an inter-relation score and an authorization score;
   the inter-relation score is assigned to the subscription request based on a relatedness to other ones of the respective services; and
   the authorization score is assigned to the subscription request based on at least one of a security factor and a trust factor associated with the requesting member of the plurality of recipients.

4. The system of claim 1, wherein:
   the unified vehicle service framework includes a syntax module configured to classify the respective services as at least one of a message service and an invocation service;
   the message service is defined as an informational message not requiring an action from the plurality of recipients; and
   the invocation service is defined as automatically triggering a pre-determined response from the plurality of recipients.

5. The system of claim 1, wherein the broker module includes:
   at least one leaf unit configured to directly engage with one or more of the plurality of providers and the plurality of recipients;
   a root server hosted by the first cloud unit, the respective services being registered at the root server; and
   at least one branch unit configured to act as an intermediary between the root server and the at least one leaf unit to route the respective services.

6. The system of claim 5, wherein:
   the least one leaf unit and the at least one branch unit are hosted by the first cloud unit; and
   the unified vehicle service framework is configured to maintain a database of the plurality of providers, the plurality of recipients and the respective services.

7. The system of claim 5, wherein:
   the least one leaf unit and the least one branch unit are hosted by the first vehicle.

8. The system of claim 5, wherein:
   the at least one branch unit is configured to execute multiple control plane modules including a children node registration module, a parent node registration module and a broker module maintenance module;
   the children node registration module and the parent node registration module include a respective data structure registering one or more nodes downstream and upstream, respectively, of the at least one branch unit in the broker module; and
   the broker module maintenance module is configured to record an entry of a new unit in the broker module and record a non-working unit in the broker module.

9. The system of claim 5, wherein:
   the at least one branch unit is configured to execute multiple data plane modules; and
   the multiple data plane modules include a physical topology maintenance module configured to maintain one or more centralized modules recording an entry of a new node or a departure of an existing node.

10. The system of claim 5, wherein:
    the at least one branch unit is configured to execute multiple data plane modules; and
    the multiple data plane modules include a data traffic shaping module configured to artificially delay traffic to allow the respective services with a higher value of the quality of service score to be transmitted relatively earlier.

11. The system of claim 10, wherein:
the multiple data plane modules include a virtual provider module configured to aggregate the respective services provided by the plurality of providers into a single virtual service when the respective services have an equal value of the quality of service score; and
the data traffic shaping module is configured to regard the single virtual service as a single piece of data.

12. A method for interfacing a plurality of providers and a plurality of recipients with a unified vehicle service framework having a processor and tangible, non-transitory memory, the method comprising:
providing the unified vehicle service framework with a quality of service filter and a broker module, the plurality of providers and the plurality of recipients being independently located;
hosting at least one of the plurality of providers and the plurality of recipients in a first cloud unit;
hosting another at least one of the plurality of providers and the plurality of recipients each respectively in a first vehicle and a second vehicle;
receiving a subscription request from a requesting member of the plurality of recipients for respective services originating in the plurality of providers, via the unified vehicle service framework;
obtaining a quality of service score as a weighted sum of multiple factors, the multiple factors including a priority score and a persistency score;
assigning the priority score to the subscription request based on a relative importance value and assigning the persistency score to the subscription request based on an average time spent by the respective services in the broker module until consumption;
determining whether the subscription request is granted based on the quality of service score assigned by the quality of service filter and notifying the requesting member of the plurality of recipients, via the unified vehicle service framework; and
when the subscription request is granted, routing the respective services through the broker module of the unified vehicle service framework.

13. The method of claim 12, further comprising:
including an inter-relation score and an authorization score in the multiple factors determining the quality of service score;
assigning the inter-relation score to the subscription request based on a relatedness to other ones of the respective services; and
assigning the authorization score to the subscription request based on at least one of a security factor and a trust factor associated with the requesting member of the plurality of recipients.

14. The method of claim 12, further comprising:
hosting yet another at least one of the plurality of providers and the plurality of recipients in a second cloud unit;
maintaining a database of the plurality of providers, the plurality of recipients and the respective services, via the unified vehicle service framework;
classifying the respective services as one of a message service and an invocation service, via a syntax module in the unified vehicle service framework;
defining the message service as an informational message not requiring an action by the plurality of recipients; and
defining the invocation service as automatically triggering a pre-determined response from the plurality of recipients.

15. The method of claim 12, wherein the broker module includes at least one leaf unit, at least one branch unit and a root server, the method further comprising:
hosting the root server in the first cloud unit and registering the respective services at the root server;
directly engaging with one or more of the plurality of providers and the plurality of recipients through the at least one leaf unit; and
employing the at least one branch unit as an intermediary between the root server and the at least one leaf unit to route the respective services.

16. The method of claim 15, further comprising:
hosting the least one leaf unit and the at least one branch unit in the first cloud unit.

17. The method of claim 15, further comprising:
hosting the least one leaf unit and the least one branch unit in the first vehicle.

18. The method of claim 15, further comprising:
configuring the at least one branch unit to execute multiple control plane modules, including a children node registration module, a parent node registration module and a broker module maintenance module;
registering one or more nodes downstream and upstream of the at least one branch unit via the children node registration module and the parent node registration module, respectively; and
recording an entry of a new unit in the broker module and recording a non-working unit in the broker module, via the broker module maintenance module.

19. The method of claim 15, further comprising:
configuring the at least one branch unit to execute multiple control plane modules, including a data traffic shaping module and a virtual provider module;
artificially delaying traffic to allow the respective services with a relatively higher value of the quality of service score to be transmitted relatively earlier, via the data traffic shaping module;
aggregating the respective services provided by the plurality of providers into a single virtual service when the respective services have an equal value of the quality of service score, via the virtual provider module; and
configuring the data traffic shaping module to regard the single virtual service as a single piece of data.

20. A system for interfacing a plurality of providers and a plurality of recipients, the system comprising:
a unified vehicle service framework configured to communicate with the plurality of providers and the plurality of recipients, the unified vehicle service framework including a quality of service filter and a broker module;
wherein the plurality of providers and the plurality of recipients are independently located;
a first cloud unit having at least one of the plurality of providers and the plurality of recipients;
a plurality of vehicles including a first vehicle and a second vehicle, the first vehicle and the second vehicle each respectively having another at least one of the plurality of providers and the plurality of recipients;
wherein the unified vehicle service framework includes a processor and tangible, non-transitory memory on which instructions are recorded, execution of the instructions by the processor causing the unified vehicle service framework to:

maintain a database of the plurality of providers, the plurality of recipients and respective services originating in the plurality of providers;

receive a subscription request from a requesting member of the plurality of recipients for the respective services;

determine whether the subscription request is granted based on a quality of service score assigned by the quality of service filter and notify the requesting member of the plurality of recipients; and when the subscription request is granted, route the respective services through the broker module;

wherein the broker module includes at least one leaf unit configured to directly engage with one or more of the plurality of providers and the plurality of recipients, and a root server hosted by the first cloud unit, the respective services being registered at the root server;

wherein the at least one branch unit is configured to execute multiple control plane modules including a children node registration module, a parent node registration module and a broker module maintenance module;

wherein the children node registration module and the parent node registration module include a respective data structure registering one or more nodes downstream and upstream, respectively, of the at least one branch unit in the broker module; and wherein the broker module maintenance module is configured to record an entry of a new unit in the broker module and record a non-working unit in the broker module.

* * * * *